(12) United States Patent
Chung et al.

(10) Patent No.: US 7,953,984 B1
(45) Date of Patent: May 31, 2011

(54) ENHANCED MALWARE DETECTION UTILIZING TRANSPARENTLY INTEGRATED SEARCHING

(75) Inventors: Chang-Wei Chung, Taipei (TW); Yu-Cheng Hsu, Taipei (TW); Chia-Tai Chang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1056 days.

(21) Appl. No.: 11/427,688

(22) Filed: Jun. 29, 2006

(51) Int. Cl.
*G06F 11/30* (2006.01)
*G06F 11/00* (2006.01)
(52) U.S. Cl. ............... 713/188; 726/23; 726/24; 726/25
(58) Field of Classification Search .............. 726/23–25; 713/188
See application file for complete search history.

(56) References Cited

U.S. PATENT DOCUMENTS

| | | | | |
|---|---|---|---|---|
| 6,721,721 B1 * | 4/2004 | Bates et al. | ...................... | 707/1 |
| 7,086,050 B2 * | 8/2006 | Barton et al. | ................. | 717/173 |
| 7,096,215 B2 * | 8/2006 | Bates et al. | ........................ | 707/3 |
| 2004/0209608 A1 * | 10/2004 | Kouznetsov et al. | ......... | 455/418 |
| 2006/0130141 A1 * | 6/2006 | Kramer et al. | .................. | 726/23 |

* cited by examiner

*Primary Examiner* — Nasser Moazzami
*Assistant Examiner* — Mohammad W Reza
(74) *Attorney, Agent, or Firm* — IP Strategy Group, P.C.

(57) ABSTRACT

A computer-implemented method detecting malware that includes providing a malware detection application and providing a search engine, the search engine being configured to receive data and commands from the malware detection application and to return data pertaining to search results to the malware detection application. The method also includes sending at least one of scan options and at least one malware-suggestive pattern from the malware detection application to the search engine. The method additionally includes searching, using the search engine and the at least one of scan options and the at least one malware-suggestive pattern, to obtain data pertaining to scan targets. The method also includes sending the data pertaining to the scan targets from the search engine to the malware detection application. The method further includes performing malware detection, using the malware detection application and the data pertaining to the scan targets, on the scan targets.

16 Claims, 4 Drawing Sheets

ENHANCED MALWARE DETECTION UTILIZING TRANSPARENTLY INTEGRATED SEARCHING

BACKGROUND OF THE INVENTION

Anti-malware programs have been around for some time. With the wide-spread use of computers, some misguided individuals and/or enterprises have employed a variety of techniques to spread malware to computers of unsuspecting users. As the term is employed herein, malware refers to malicious, harmful and/or undesirable executables and/or data, including for example and without limitation computer virus, spy programs, unsolicited advertisements, advertising executables, undesirable content, etc.

Anti-malware programs are designed to detect and/or eliminate malware. Detection is typically accomplished via the scanning of files and folders for malware using a periodically updated malware definition file (such as a virus definition file). By comparing the file being scanned with the malware definition file, patterns suggestive of malware may be detected. If malware is detected in a given file, the file can be flagged for attention (which may include, for example, repair or deletion).

Generally speaking, it is possible to specify that every file and folder on the entire disk should be scanned. In fact, experts in malware prevention suggest that a comprehensive disk scan should be performed with the most updated malware definition file from time to time.

However, as the role of the computer changes from a purely text-based calculating machine to a rich, multimedia business and entertainment device, the number of files stored on a given user's computer has increased greatly in recent years. As a result, the size of the hard drive or other forms of storage required to store these files has also increased correspondingly. For example, while a typical user may be satisfied with a 20-gigabyte hard drive only a few years ago, the same user today may find a computer having less than 100 gigabytes of hard drive storage to be unduly restricting.

Performing a comprehensive disk scan on a large hard drive that may store tens of thousands of large files is a time-consuming task. Further, while the computer is busy scanning files, the processing and storage bandwidth available to perform other tasks on behalf of the user is reduced.

To alleviate user frustration, manufacturers have been attempting to find ways to speed up the scanning process so as to reduce the amount of time the user computer needs to devote to scanning files. One way to reduce the amount of scanning (and correspondingly the scanning time) is to allow the user to specify which folder should be scanned, and optionally the type(s) of files to be scanned. By scanning only a specified subset of all available files or only a specified subset of all available folders, the scanning can be accomplished in less time and with less impact to the computing and processing bandwidth.

Generally speaking, users have been able to specify to the anti-malware program the network path of the folder to be scanned. As mentioned, many anti-malware programs also allow the user to specify the type of files to be scanned (e.g., emails, executables, image files, PDF files, etc.) and even the exact name of the file(s) to be scanned. The user may communicate the user's selection of the folders or files for scanning using, for example, a dialog box provided by the malware program.

However, as the number and types of files increase and as hard drives get larger over time, it has been difficult for a typical user to remember all the names of files and folders to properly instruct the anti-malware program with regard to which folder(s) and which file(s)/file type(s) should be scanned. Yet, if the user forgets a particular folder or a particular file and consequently fails to specify to the anti-malware program of the identity of one of the folders and/or files(s) to be scanned, there is a risk that the scan may fail to detect malware since the malware may lurk in one of the folders that the user failed to designate to the anti-malware program for scanning.

SUMMARY OF INVENTION

The invention relates, in an embodiment, to a computer-implemented method and system for detecting malware. A method embodiment includes providing a malware detection application and providing a search engine, the search engine being configured to receive data and commands from the malware detection application and to return data pertaining to search results to the malware detection application. The method also includes sending at least one of scan options and at least one malware-suggestive pattern from the malware detection application to the search engine. The method additionally includes searching, using the search engine and the at least one of scan options and the at least one malware-suggestive pattern, to obtain data pertaining to scan targets. The method also includes sending the data pertaining to the scan targets from the search engine to the malware detection application. The method further includes performing malware detection, using the malware detection application and the data pertaining to the scan targets, on the scan targets.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
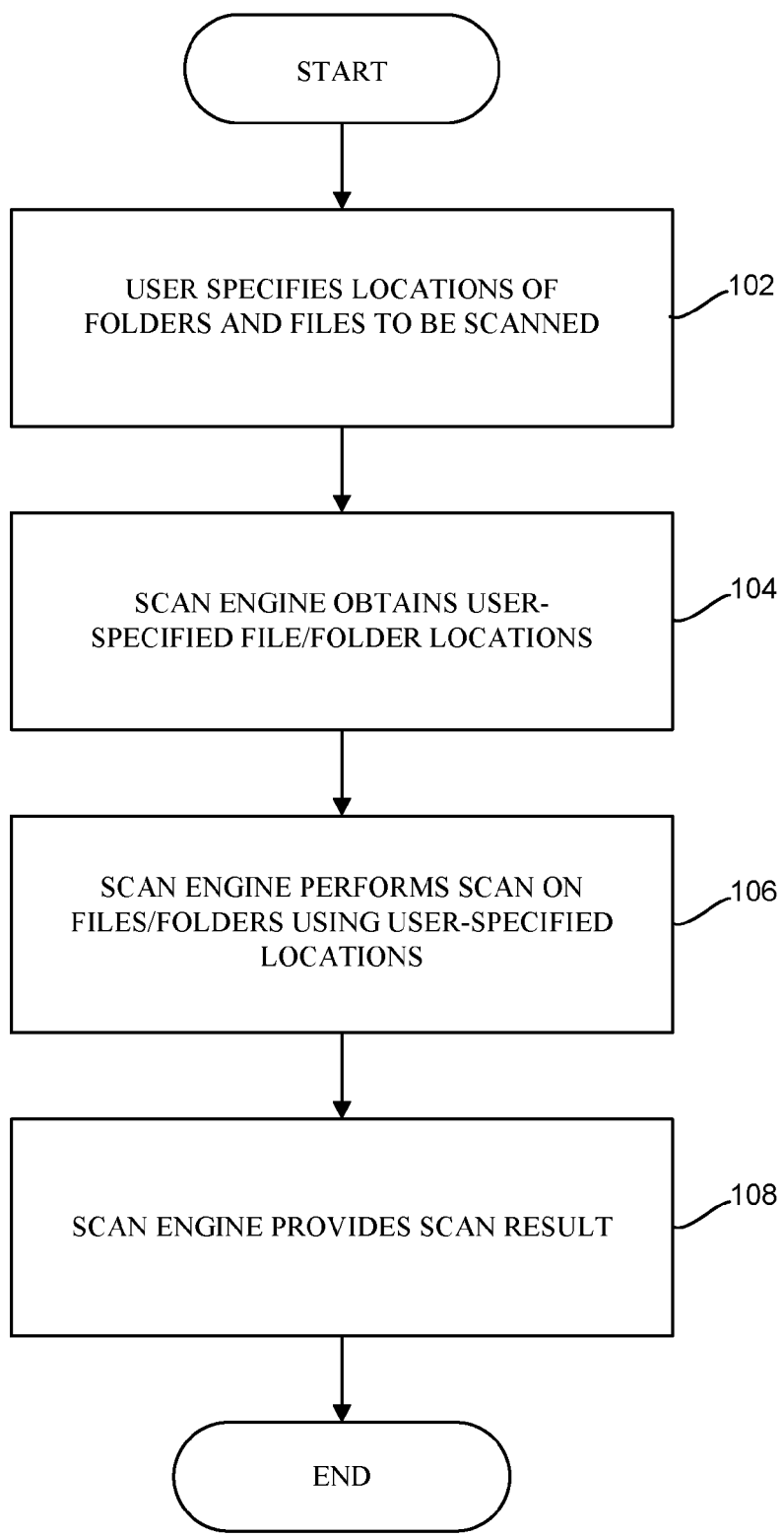
FIG. 1 depicts a conventional prior art technique for scanning files or folders.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, the inventors herein realize that as the average user accumulates an ever-increasing volume of data, the use of a search engine has rapidly become a necessity. In fact, many computers are now provisioned with search engines, many of which are available for downloading for free from the internet or at a very low cost.

A search engine typically builds a search index either on-the-fly or periodically based on some predefined schedule or when triggered by some triggering action. Desktop search engines by companies such as Google, Inc. (Mountain View, Calif.), Yahoo, Inc. (Santa Clara, Calif.), or Microsoft Corporation (Redmond, Wash.) have been available for some time to allow a user to search through his computer for files and/or folders based on the user input search keys. At the enterprise level, search engines from Google, Inc. for example has been employed to allow users of enterprise computing systems to search across network domains or even search in servers on the public network that is known as the Internet.

Search engines specialize in high-speed searching and in keeping up to date with newly introduced file formats so that the search can be as thorough as possible. Many search engines can even look inside encrypted or password protected files. Some search engines also employ intelligent algorithms to obtain more relevant search results than those obtainable by a brute-force matching technique. Because search engines aim to provide fast, up-to-date, and comprehensive searching as well as accurate and relevant results, search engines companies frequently update the deployed search engines with new capabilities to more thoroughly look into files and folders and to more intelligently provide the result desired by the user.

It is realized by the inventors herein that since the use of search engines is now wide-spread, it is inefficient to require users to manually specify the location of files and folders to be scanned, as is done with present day virus scan software. Embodiments of the invention herein pertain to techniques for improving malware detection by leveraging on integrated search engines. In some embodiments of the invention, the search engine is enslaved to the malware detection application such that the search engine receives scan options directly from the malware detection application. Using the received scan options, the search engine obtains scan targets for the scan engine to scan.

In this embodiment, the user may interact with the malware detection application to specify scan options. The malware detection application then leverages on the more efficient search engine to obtain scan targets based on scan options such as file type, file name, file size, etc. The search engine locates the scan targets based on the provided scan options (which scan target may include any combination of files, folders, window registry keys, memory allocation, or any whole or portion of media accessible to the search engine). The scan targets are then returned to the malware detection application for scanning.

Note that this embodiment enslaves the search engine to the malware detection application so that while the enhanced search capability of the search engine is leveraged to its advantage, the user still interacts with a single application (i.e., the malware detection application) since the communication between the malware detection application and the search engine takes place via an API (application programming interface) in a manner substantially transparent and seamless to the user. However, because the enhanced search capability of the search engine is now available, there is substantially more flexibility in the manner with which the user can specify the scan options.

For example, search engines in the past typically require the user to specify the exact path of the folder to be scanned either by directly typing in the folder path or by navigating via a browse mechanism to the folder to be scanned. A similar requirement exists with respect to specifying files to be scanned in the prior art.

Using the enhanced integrated search capability, the user may specify options such as "scan folders that contain files updated since Jan. 1, 2004" or "scan files with the extension .doc" or "scan files that contain anywhere in the file a particular string xxxyyyzzz", and these files and folders would be obtained by the search engine and provided to the scan engine for scanning irrespective of the location of the target files and target folders in the file or folder hierarchy. The point is the user can now specify scan options to a malware detection application with the same flexibility previously afforded only to search engine users, and the interaction between the search engine and the malware detection application that makes such flexibility possible is substantially or completely transparent to the user.

Furthermore, the high speed searching capability of the search engine is now made transparently available to the user's benefit (in term of more relevant scanning targets and/or shorter scan time) to enable the user to more quickly detect and address a potential malware situation. As an example, suppose IT (Information Technology) personnel of ABC, Inc. becomes aware that a computer virus has infected the electronic mail system of DEF, Inc. such that attachments of type GHY from DEF, Inc. may contain a computer virus. A full scan of all employee emails may require hours, if not days.

Using embodiments of the present invention, the IT personnel may specify to the malware detection application that only emails from DEF, Inc. having attachment of type GHY should be scanned. The search engine in this hypothetical example may be given, as scan options, options for email files that contain the string "ADEF.com" in the "From" field and having one or more attachment of type GHY. The search performed using a search index file of the type typically employed by modern search engines can quickly pinpoint the scan targets (in seconds or less, in most cases) and provide the scan target folders and files to the scan engine of the malware detection application. Since the malware detection application has fewer files to scan, the scan result can be obtained in minutes instead of the hours that would have been required if all employee emails are to be scanned.

In other embodiments of the invention, the search engine is enslaved to the malware detection application such that the search engine receives scan patterns directly from the malware detection application to obtain scan targets for the scan engine. In this embodiment, the user may interact with the malware detection application to specify that a system scan or a scan of the entire drive is desired, for example. In an embodiment, scan options may be specified as well, as discussed above, to reduce the number of scan targets to be scanned. Even if the target is generically specified by the user (e.g., entire system or entire drive), this embodiment utilizes the ability of the search engine to quickly search inside files and folders for patterns suggestive of malware. Since search engines are frequently updated by their manufacturers to ensure that search results from files having any given format are available, embodiments of the invention exploit this fact to advantage to obtain a large number of relevant scan targets.

Furthermore, embodiments of the invention leverage on the fact that malware definition files (which may contain, among other things, textual and/or graphical patterns characteristic of malware) are frequently updated by manufacturers of malware detection applications. By slaving the search engine to the malware detection application via an API that allows them to cooperatively exchange information in a manner that is substantially transparent to the user, the malware detection application can provide up-to-date malware patterns to the search engine to allow the search engine to utilize its search capability to quickly find accurate and relevant scan targets. The scan targets are then returned to the malware detection application for scanning.

Note that this embodiment enslaves the search engine to the malware detection application so that while the up-to-date malware patterns and enhanced search capability of the search engine are synergistically leveraged to advantage, the user still interacts with a single application (i.e., the malware detection application) since the communication between the malware detection application and the search engine takes place via APIs (application programming interfaces) in a manner that is substantially transparent and seamless to the user. Again, one of the benefits is the ability to quickly and accurately filter through a vast number of files and folders for any file or any folder that contain any of the dozens, hundreds, or thousands of malware patterns, and to provide the target files/folders to the scan engine for scanning. Since the malware detection application has fewer files to scan, the scan result can be obtained in seconds or minutes instead of the hours that would have been required if, for example, every single file and folder in a hard drive is scanned.

The invention may be better understood with reference to the figures and discussions that follow. In FIG. 1, a conventional prior art technique for scanning files or folders is depicted. In step 102, the user specifies the exact files or folders to be scanned. For example, the user may employ a browse dialog box to navigate to the file/folder to be scanned. In step 104, the specified files or folders are obtained by the scan engine for scanning. In step 106, the scan engine performs the scan on the user-specified files/folders. In step 108, the scan engine provides the scan result.

Note that the prior art technique of FIG. 1 requires the user to know or at least have an idea where the at-risk files and/or folders are located before the user can provide the folder path and/or file names to the scan engine for scanning. If, for example, the user has large number files/folders, that user may not be able to remember where the files or folders that are at risk are located on the disk drive and thus may be unable to provide information to the scan engine for scanning. A similar problem occurs if the file or folder are those automatically generated (such as temporary files that are automatically generated by a browser program during web browsing), and a user may have no idea that these files and folders exist on his computer, much less to provide them to the scanning engine for scanning.

Figure 2:
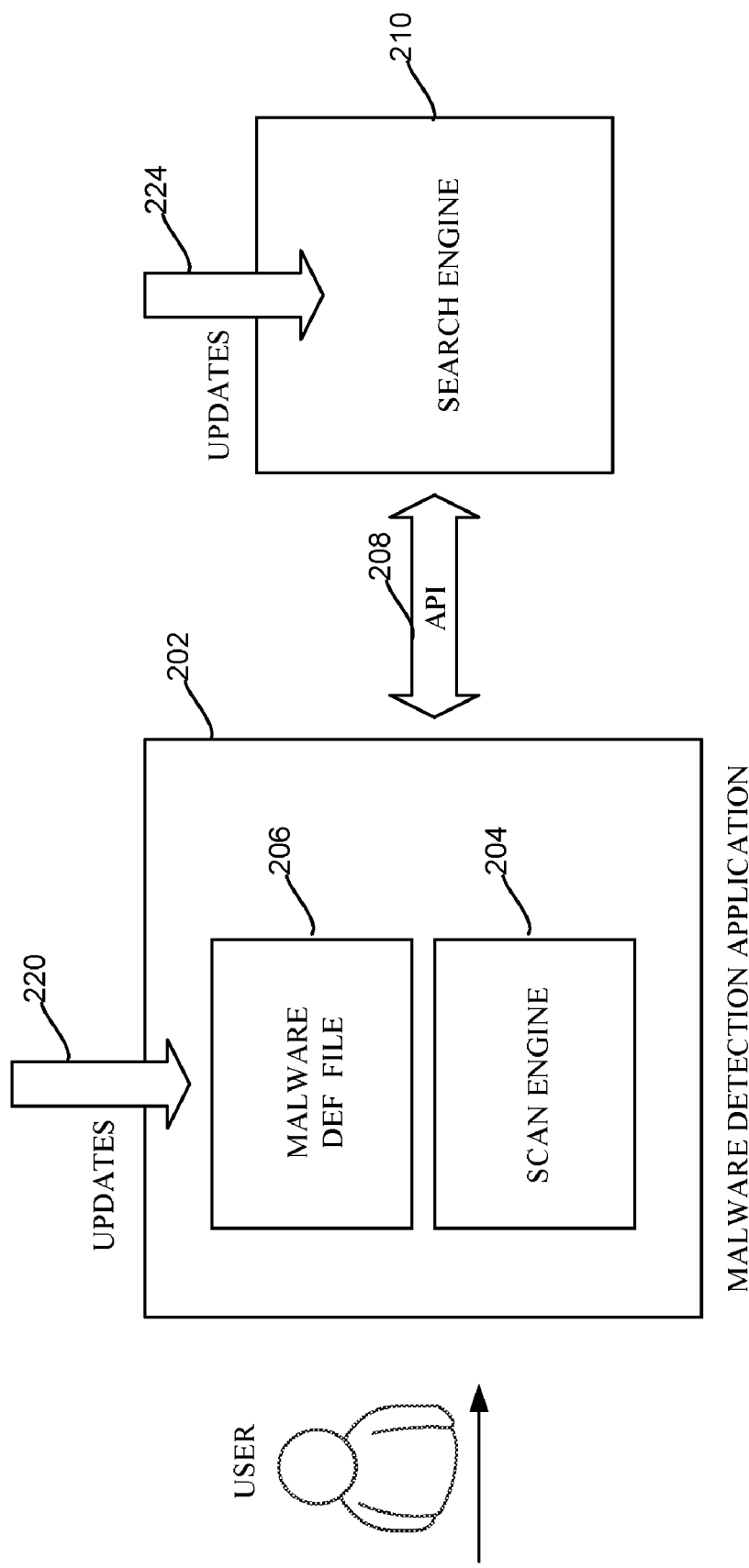
FIG. 2 shows, in accordance with an embodiment of the invention, an architecture of the improved scanning architecture.

FIG. 2 shows, in accordance with an embodiment of the invention, an architecture of the improved scanning architecture. A malware detection application 202 having therein a scan engine 204 and a malware definition file 206 is shown. An application programming interface (API) 208 allows the malware detection application to send data and commands to a search engine 210, as well as allowing search engine 210 to send data regarding scan targets to malware detection application 202. Note that both malware definition file 206 and search engine 210 are shown with frequent updates 220 and 224 respectively to signify that both these components are frequently updated. That is, malware definition file 206 is frequently updated with the latest malware definitions/patterns by the malware detection application manufacturer, while search engine 210 has a search index that is updated frequently or in real time to ensure that new or changed files are timely included for searching. The search engine algorithm as well as the scanning engine may also be updated from time to time. For example, the search engine algorithm may be updated to enable the search engine to look inside and index a new or an encrypted file. As another example, the scanning engine may be updated to enable to scan engine to more efficient detect malware from the scan targets provided by search engine 210.

Figure 3:
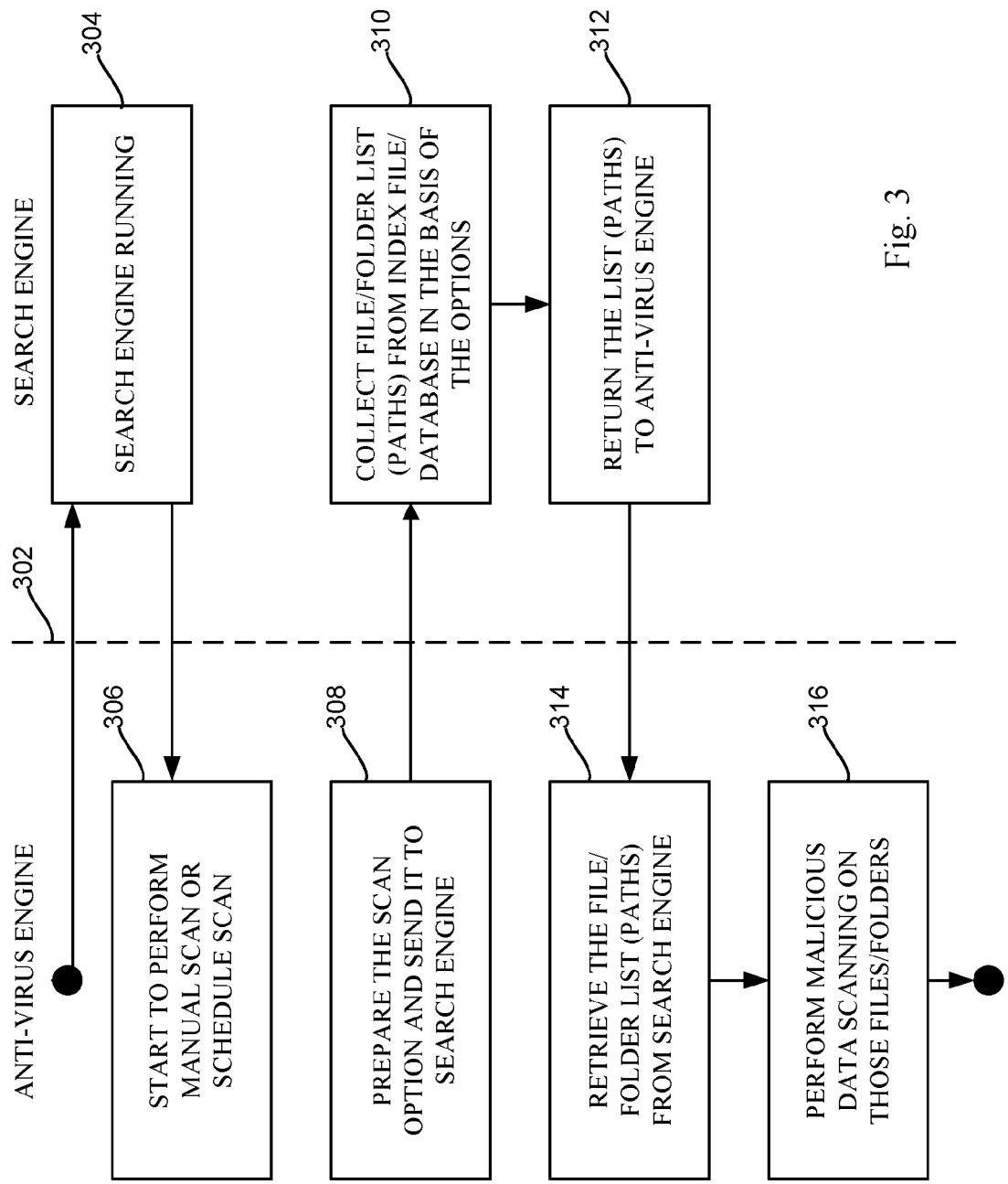
FIG. 3 is a flowchart depicting an embodiment of the enhanced scanning technique.

FIG. 3 is a flowchart depicting an embodiment of the enhanced scanning technique. In FIG. 3, line 302 separates the malware detection application domain (left side of line 302) from the search engine domain (right side of line 302). Without limiting the invention, an anti-virus application is employed to represent the malware detection application in the example of FIG. 3. However, it should be understood that the invention is broadly applicable to all types of malware detection applications beyond virus detection (e.g., spyware detection, adware detection, malicious or undesirable content detection, etc.). In step 304, the search engine is running or is initiated by the computer's operating system or, in an example, by the anti-virus engine via the API. Furthermore, the anti-virus engine may also be configured to request, periodically or upon a trigger event via the API, that the search engine updates its search index.

In step 306, the anti-virus engine initiates a scan, either upon command by the user or automatically upon a triggering event or on a predefined schedule. In an embodiment, the initiation of a scan may represent a triggering event to cause the anti-virus engine to request the search engine to update the search index if, for example, the index is older beyond a certain time threshold, for example. In step 308, the scan options are prepared, (by obtaining them from the user or from a file, for example). The scan options may represent, for example, any combination of file type, file name, file size, file extension name (e.g., .exe), file checksum (e.g., md5), file last modification date, file creation date, file access date, file content, and any property of files/folders that are searchable by the search engine. The scan options are then formatted if needed and sent to the search engine to enable the search engine to search its index file for scan targets that satisfy the scan options (step 310).

In step 312, the list of scan targets, represents the search result, is returned to the anti-virus engine from the search engine. As an advantage of the invention, the search result is returned from the search engine to the anti-virus engine instead of being displayed to a human operator and requiring the human operator to subsequently manually enter the search result into the malware detection application. The anti-virus engine receives the list in step 314. In step 316, the anti-virus engine begins to scan through the scan targets in the list returned from the search engine. For a generalized malware detection application, the scan in step 316 may represent any combination of virus scan, spyware scan, adware scan, heuristic scans for known viruses, file content scan, or any other scan for malware. Since fewer targets need to be scanned (because the targets have in essence been pre-selected by the fast search engine), the scanning of step 316 may take only fraction of the time required to perform a full scan of every possible file and/or folder.

Figure 4:
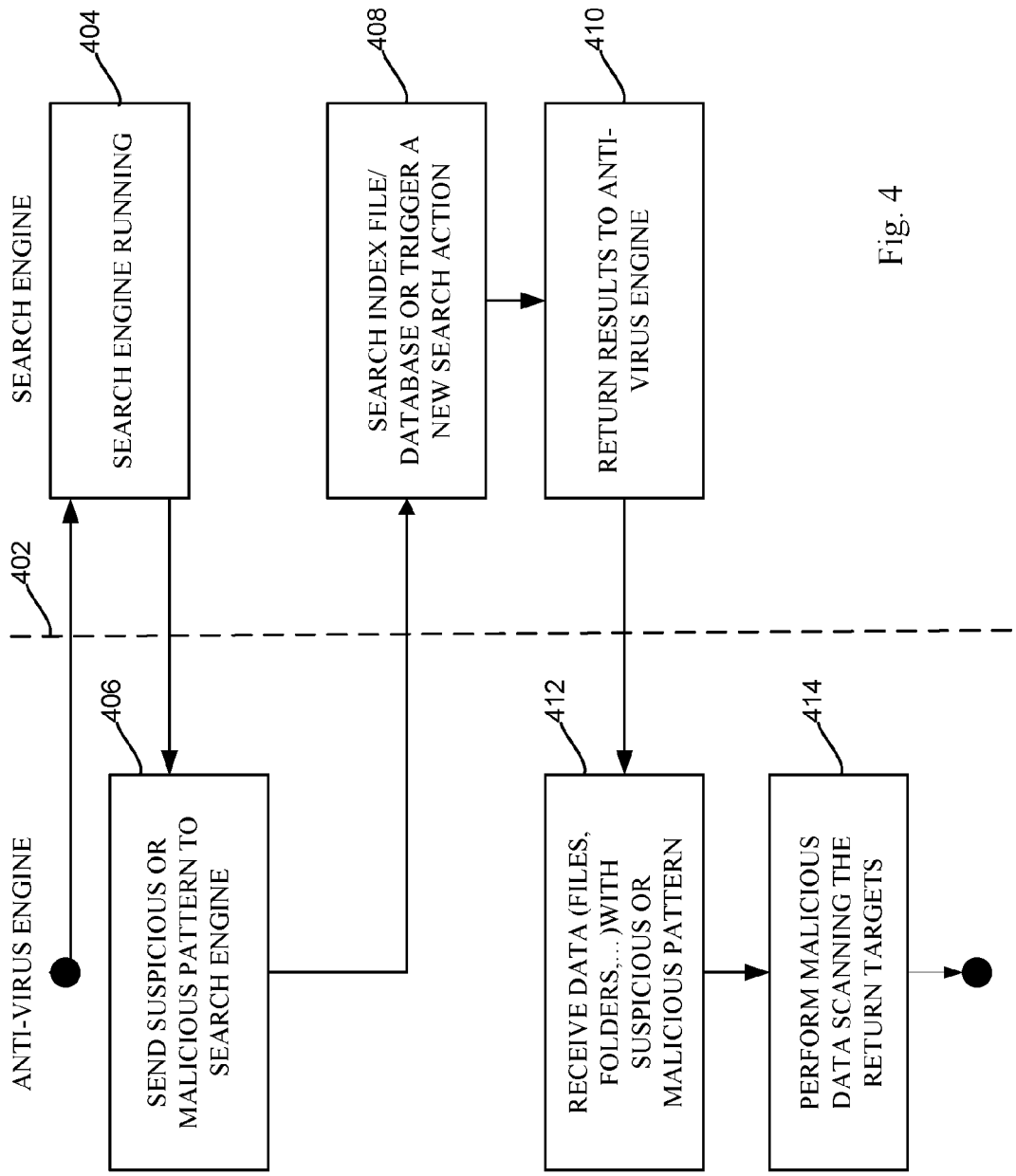
FIG. 4 is a flowchart depicting another embodiment of the enhanced scanning technique.

FIG. 4 is a flowchart depicting another embodiment of the enhanced scanning technique. In FIG. 4, the search engine employs malware-suggestive patterns to search for the scan targets before providing the scan targets to the malware detection application for scanning.

In FIG. 4, line 402 separates the malware detection application domain (left side of line 402) from the search engine domain (right side of line 402). Without limiting the invention, an anti-virus application is employed to represent the malware detection application in the example of FIG. 4. However, it should be understood that the invention is broadly applicable to all types of malware detection applications beyond virus detection (e.g., spyware detection, adware detection, malicious or undesirable content detection, etc.).

In step 404, the search engine is running or is initiated by the computer's operating system or, in an example, by the anti-virus engine via the API. Furthermore, the anti-virus engine may also be configured to request, periodically or upon a trigger event via the API, that the search engine updates its search index.

In step 406, the anti-virus engine initiates a scan, either manually by the user or automatically upon a triggering event or on schedule. In an embodiment, the initiation of a scan may represent a triggering event to cause the anti-virus engine to request the search engine to update the search index if, for example, the index is older beyond a certain time threshold, for example. Scan initiation in step 406 includes sending malware-suggestive patterns (i.e., patterns that if found in a file or folder may suggest that the file or folder contain malware) to the search engine. In an embodiment, the malware-suggestive patterns represent the malware definitions in the malware definition file (such as a virus definition file in the case of an anti-virus engine).

In step 408, the search engine searches its index file for scan targets that contain one or more malware-suggestive patterns. In step 410, the list of scan results are returned to the anti-virus engine. As an advantage of the invention, the search result is returned from the search engine to the anti-virus engine instead of being displayed to a human operator and requiring the human operator to subsequently manually enter the search result into the malware detection application. The anti-virus engine receives the list in step 412. In step 414, the anti-virus engine begins to scan through the scan targets in the list returned from the search engine. For a generalized malware detection application, the scan in step 414 may represent any combination of virus scan, spyware scan, adware scan, heuristic scans for known viruses, file content scan, or any other scan for malware. Since fewer targets need to be scanned (because the targets have in essence been pre-selected by the fast search engine), the scanning of step 414 may take only fraction of the time required to perform a full scan of every possible file and/or folder.

As can be appreciated from the foregoing, embodiments of the invention enable the malware detection application to more efficiently, quickly, and accurately detect the presence of malware. By integrating, in a manner that is substantially transparent to the user, the capabilities of the powerful search engine with its frequently updated search index with the capabilities of the scan engine with its frequently updated malware definition file, enhanced scan flexibility and improved malware detection are achieved while reducing the amount of time and computing resources required for the task of malware detection.

While this invention has been described in terms of several preferred embodiments, there are alterations, permutations, and equivalents, which fall within the scope of this invention. It should also be noted that there are many alternative ways of implementing the methods and apparatuses of the present invention. Further, the abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A computer-implemented method for detecting malware, the method comprising:

receiving scan options using a malware detection application, said malware detection application including at least a malware definition file and a scan engine, at least one of said scan options and formatted scan options resulted from formatting said scan options being searchable by a search engine, said search engine being stored in a computer readable medium;

sending said at least one of said scan options and said formatted scan options from said malware detection application to said search engine via an application programming interface (API);

searching a set of data that includes an index file, using said search engine based on said at least one of said scan options and said formatted scan options, to obtain data pertaining to scan targets, wherein said index file is indexed prior to said searching;

sending said data pertaining to said scan targets from said search engine to said malware detection application;

performing malware detection, using said scan engine of said malware detection application and said data pertaining to said scan targets, on said scan targets; and using said malware detection application to request said search engine to update a search index.

2. The method of claim 1 wherein said scan options include at least one of a file last modification date, a file creation date, a file access date.

3. The method of claim 1 wherein said scan options include at least an email sender field text string.

4. The method of claim 1 wherein said scan options include at least an email attachment type.

5. The method of claim 1 further comprising formatting said scan options to generate said formatted scan options.

6. A computer-implemented method for detecting malware, the method comprising:

receiving scan options using a malware detection application, said malware detection application including at least a malware definition file and a scan engine, at least one of said scan options and formatted scan options resulted from formatting said scan options being searchable by a search engine, said search engine being stored in a computer readable medium;

sending at least one of said malware definition, said scan options, and said formatted scan options from said malware detection application to said search engine via an application programming interface (API);

searching a set of data that includes an index file, using said search engine and said at least one malware definition, to obtain data pertaining to scan targets, wherein said index file is indexed prior to said searching;

sending said data pertaining to said scan targets from said search engine to said malware detection application;

performing malware detection, using said scan engine of said malware detection application and said data pertaining to said scan targets, on said scan targets; and using said malware detection application to request said search engine to update a search index.

7. The method of claim 6 wherein said scan options include at least one of a file last modification date, a file creation date, a file access date.

8. The method of claim 6 wherein said scan options include at least an email sender field text string.

9. The method of claim 6 wherein said scan options include at least an email attachment type.

10. The method of claim 6 further comprising formatting said scan options to generate said formatted scan options.

11. A malware detection system comprising:

a malware detection application including at least a malware definition file and a scan engine, said malware detection application being configured to receive scan options;

a search engine stored in a non-transitory computer readable medium, said search engine being configured to receive at least one of said scan options and formatted scan options from said malware detection application, said formatted scan options being resulted from formatting said scan options, said at least one said scan options and said formatted scan options being searchable by said search engine, said search engine being further configured to search a set of data that includes an index file based on said at least one of said scan options and said formatted scan options to find scan targets, said search engine being further configured to send data pertaining to said scan targets to said malware detection application, wherein said scan engine is configured to scan said scan targets, wherein said index file is indexed prior to being searched by said search engine, and wherein said malware detection application is configured to request said search engine to update a search index;

an application programming interface (API) configured to facilitate exchange of data and commands between said search engine and said malware detection application, wherein said malware detection application is configured to send said at least one of said scan options and said formatted scan options to said search engine via said API; and a micro-processor for performing tasks associated with at least one of said malware detection application and said search engine.

12. The malware detection system of claim 11 wherein said search engine is configured to generate said index file for use in finding said scan targets.

13. The malware detection system of claim 11 wherein said scan options include at least one of a file last modification date, a file creation date, a file access date.

14. The malware detection system of claim 11 wherein said scan options include at least an email sender field text string.

15. The malware detection system of claim 11 wherein said scan options include at least an email attachment type.

16. The malware detection system of claim 11 wherein said malware detection application is configured to periodically request said search engine to update said search index.

* * * * *